United States Patent
Kim et al.

(10) Patent No.: US 11,539,102 B2
(45) Date of Patent: Dec. 27, 2022

(54) BATTERY CONNECTOR FOR SERIES CONNECTION OF BATTERIES AND BATTERY PACK INCLUDING THE SAME

(71) Applicant: LG CHEM, LTD., Seoul (KR)

(72) Inventors: Ro Un Kim, Daejeon (KR); Sang Uck Kim, Daejeon (KR); Gil Young Lee, Daejeon (KR); Sang Sok Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 185 days.

(21) Appl. No.: 16/675,704

(22) Filed: Nov. 6, 2019

(65) Prior Publication Data

US 2020/0075919 A1     Mar. 5, 2020

Related U.S. Application Data

(63) Continuation of application No. PCT/KR2018/013343, filed on Nov. 6, 2018.

(30) Foreign Application Priority Data

Dec. 21, 2017   (KR) .................. 10-2017-0176853

(51) Int. Cl.
*H01M 50/502*   (2021.01)
*H01R 13/622*   (2006.01)
*H01R 13/625*   (2006.01)

(52) U.S. Cl.
CPC ........ *H01M 50/502* (2021.01); *H01R 13/622* (2013.01); *H01R 13/625* (2013.01)

(58) Field of Classification Search
CPC .. H01M 50/502; H01R 13/622; H01R 13/625
See application file for complete search history.

(56) References Cited

U.S. PATENT DOCUMENTS

| | | | | |
|---|---|---|---|---|
| 5,431,575 A | * | 7/1995 | Engira | H01M 50/588 429/100 |
| 5,900,332 A | * | 5/1999 | Marukawa | H01M 50/502 439/500 |
| 6,120,564 A | | 9/2000 | Marukawa et al. | |

(Continued)

FOREIGN PATENT DOCUMENTS

| CN | 1177844 A | 4/1998 |
|---|---|---|
| CN | 101165945 A | 4/2008 |

(Continued)

OTHER PUBLICATIONS

Extended European Search Report for European Application No. 18891717.3, dated Jul. 21, 2020.

(Continued)

*Primary Examiner* — Abdullah A Riyami
*Assistant Examiner* — Nader J Alhawamdeh
(74) *Attorney, Agent, or Firm* — Birch, Stewart, Kolasch & Birch, LLP

(57) ABSTRACT

A battery connector including a conductive plate configured to contact a first battery and a second battery so as to electrically connect the first battery and the second battery to each other, an upper fixer configured to be coupled the first battery, and a lower fixer configured to be coupled to the second battery.

9 Claims, 12 Drawing Sheets

(56) References Cited

U.S. PATENT DOCUMENTS

| | | | |
|---|---|---|---|
| 6,174,618 B1 * | 1/2001 | Nishiyama | H01M 10/6562 429/100 |
| 7,611,800 B2 * | 11/2009 | Kim | H01M 50/209 429/158 |
| 7,879,478 B2 * | 2/2011 | Kim | H01M 50/213 429/82 |
| 7,887,947 B2 | 2/2011 | Kawano et al. | |
| 8,795,874 B2 * | 8/2014 | Bae | H01M 50/502 429/158 |
| 8,828,586 B2 * | 9/2014 | Park | H01M 50/166 429/157 |
| 8,871,375 B2 * | 10/2014 | Lim | H01M 50/502 439/627 |
| 2006/0264108 A1 * | 11/2006 | Shimamori | H01R 13/622 439/627 |
| 2007/0111088 A1 * | 5/2007 | Kim | H01M 50/502 429/158 |
| 2007/0184342 A1 | 8/2007 | Kawano et al. | |
| 2008/0085446 A1 * | 4/2008 | Schmidt | H01M 50/543 429/90 |
| 2008/0096104 A1 * | 4/2008 | Kim | H01M 10/0431 429/158 |
| 2008/0182162 A1 * | 7/2008 | Kim | H01M 50/502 429/99 |
| 2011/0269011 A1 * | 11/2011 | Park | H01M 50/152 429/158 |
| 2011/0311858 A1 * | 12/2011 | Lim | H01M 50/213 429/158 |
| 2017/0244073 A1 | 8/2017 | Yusa et al. | |
| 2020/0075919 A1 * | 3/2020 | Kim | H01M 50/503 |

FOREIGN PATENT DOCUMENTS

| | | |
|---|---|---|
| CN | 101232066 A | 7/2008 |
| CN | 102237506 A | 11/2011 |
| EP | 2385566 A1 | 11/2011 |
| JP | 3312853 B2 | 8/2002 |
| JP | 2003-223876 A | 8/2003 |
| JP | 2006-324062 A | 11/2006 |
| JP | 2006-324353 A | 11/2006 |
| JP | 2007-12406 A | 1/2007 |
| JP | 2008-103302 A | 5/2008 |
| JP | 2011-238600 A | 11/2011 |
| KR | 10-0786875 B1 | 12/2007 |
| KR | 10-0825908 B1 | 4/2008 |
| KR | 10-2011-0137638 A | 12/2011 |
| KR | 10-1233342 B1 | 2/2013 |
| KR | 10-1380083 B1 | 4/2014 |
| KR | 10-2017-0048804 A | 5/2017 |
| KR | 10-2017-0086472 A | 7/2017 |

OTHER PUBLICATIONS

International Search Report for PCT/KR2018/013343 dated Apr. 16, 2019.

* cited by examiner

[FIG. 1]
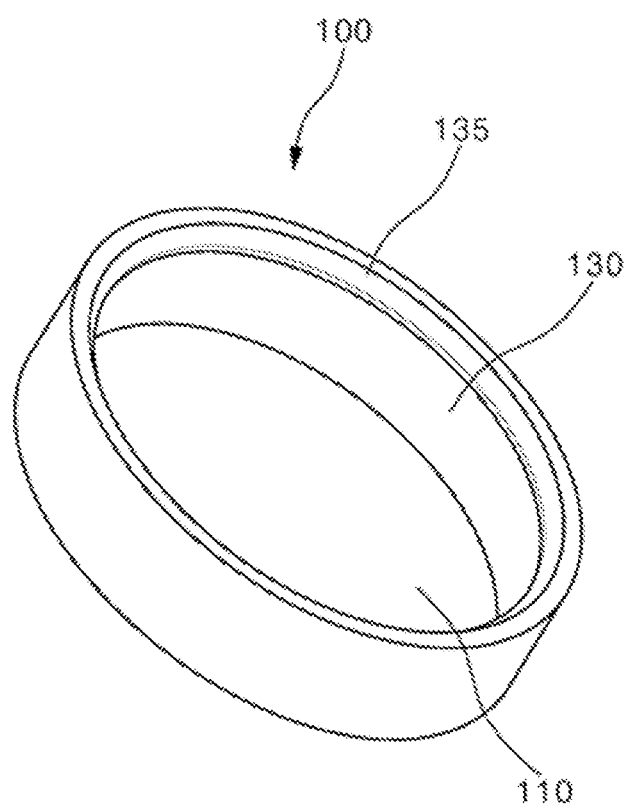

【FIG. 2】
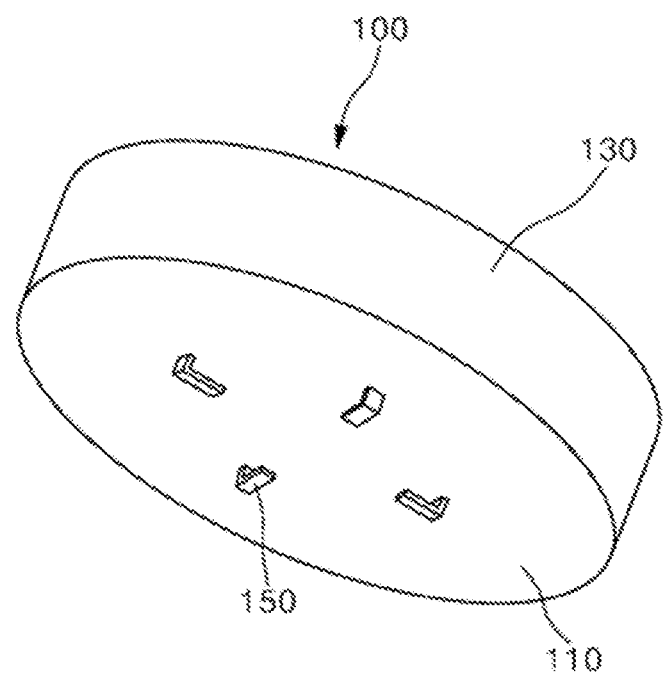

【FIG. 3】
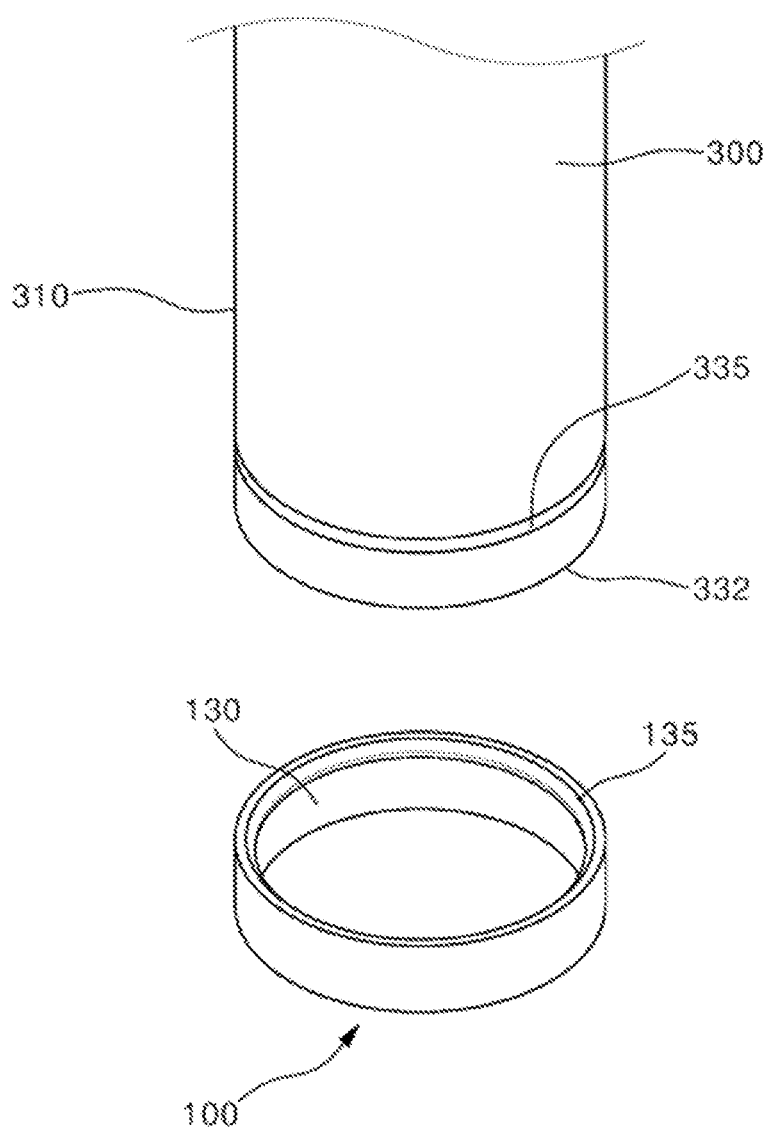

[FIG. 4]
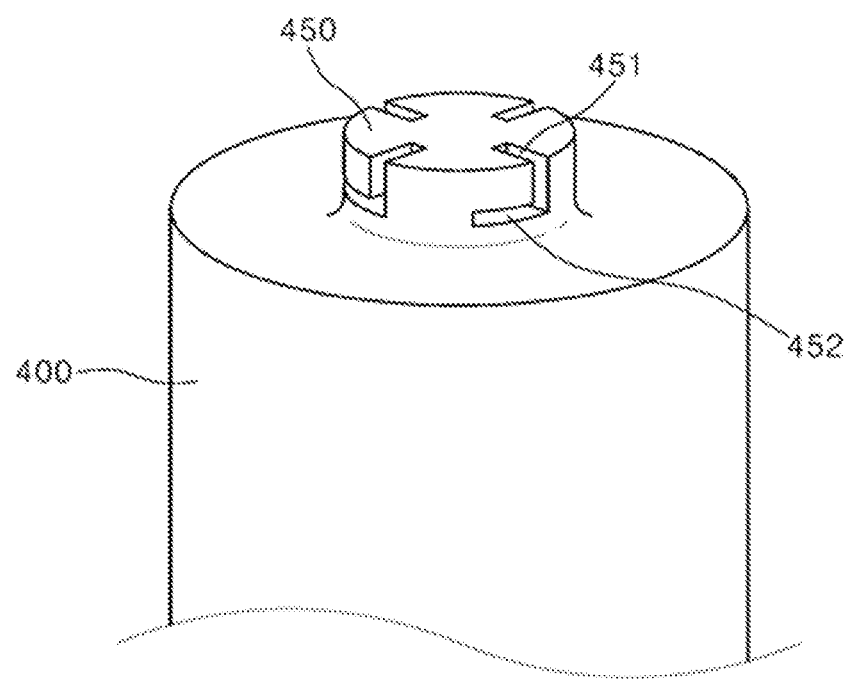

[FIG. 5]
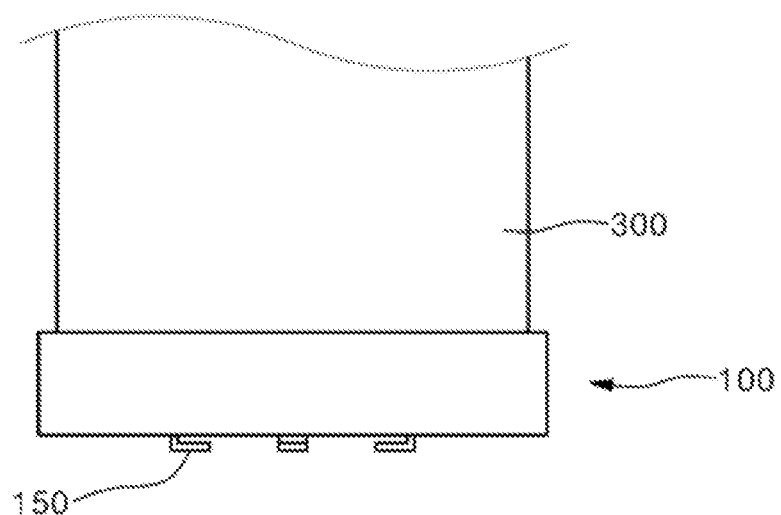
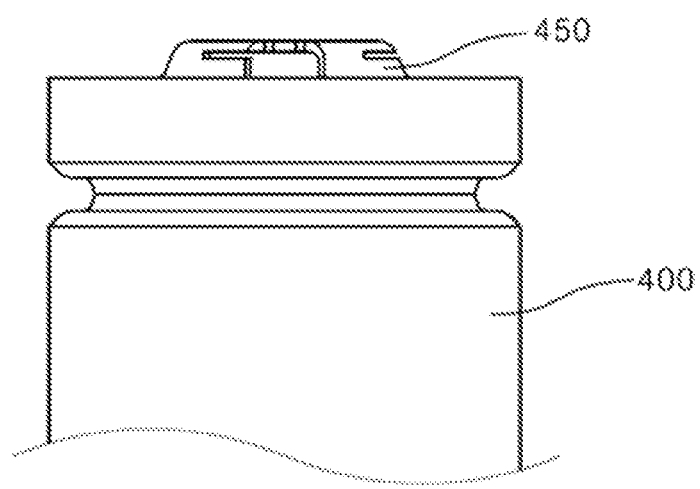

[FIG. 6]
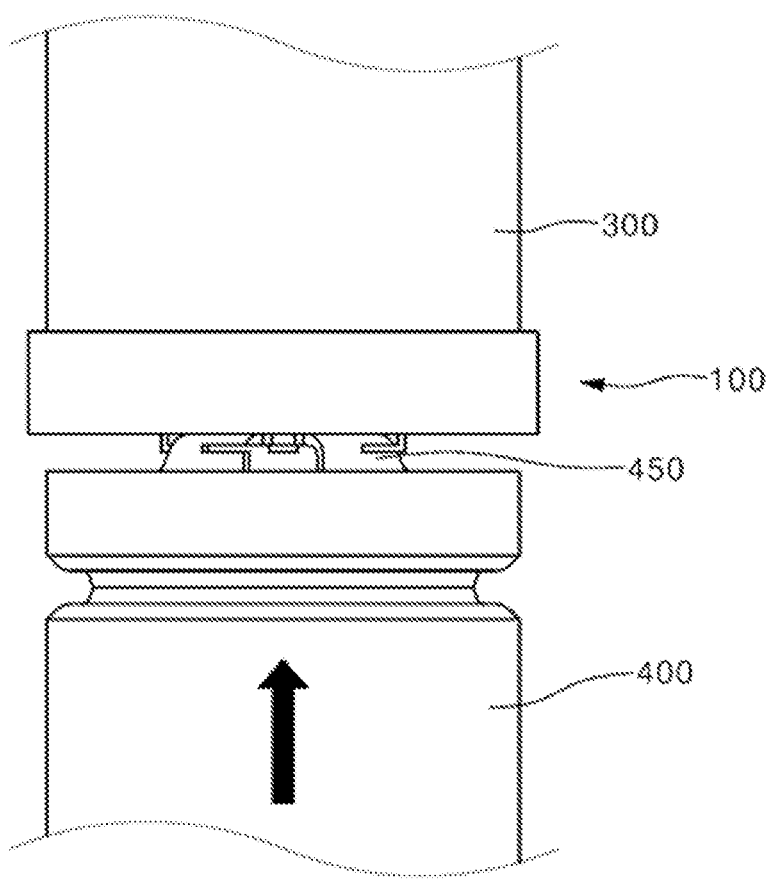

【FIG. 7】
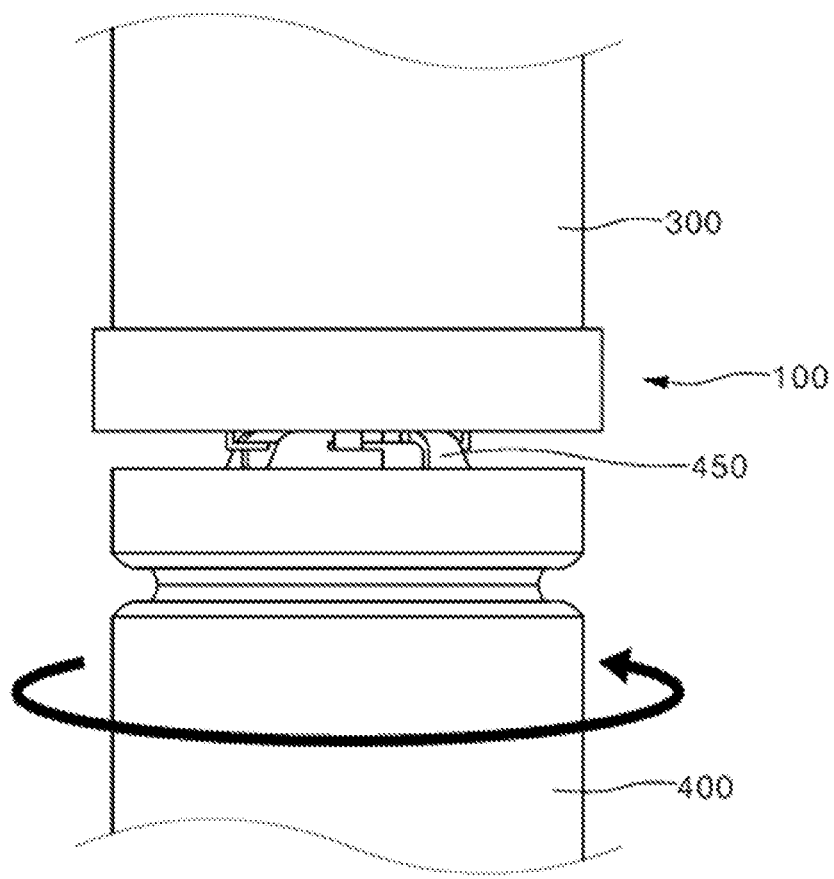

[FIG. 8]
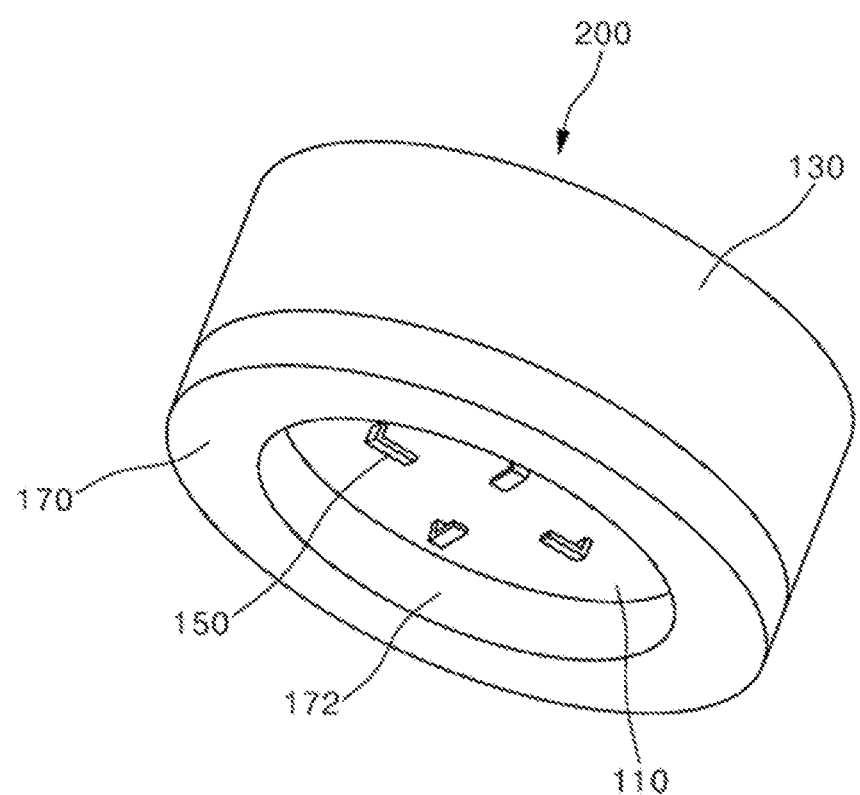

【FIG. 9】
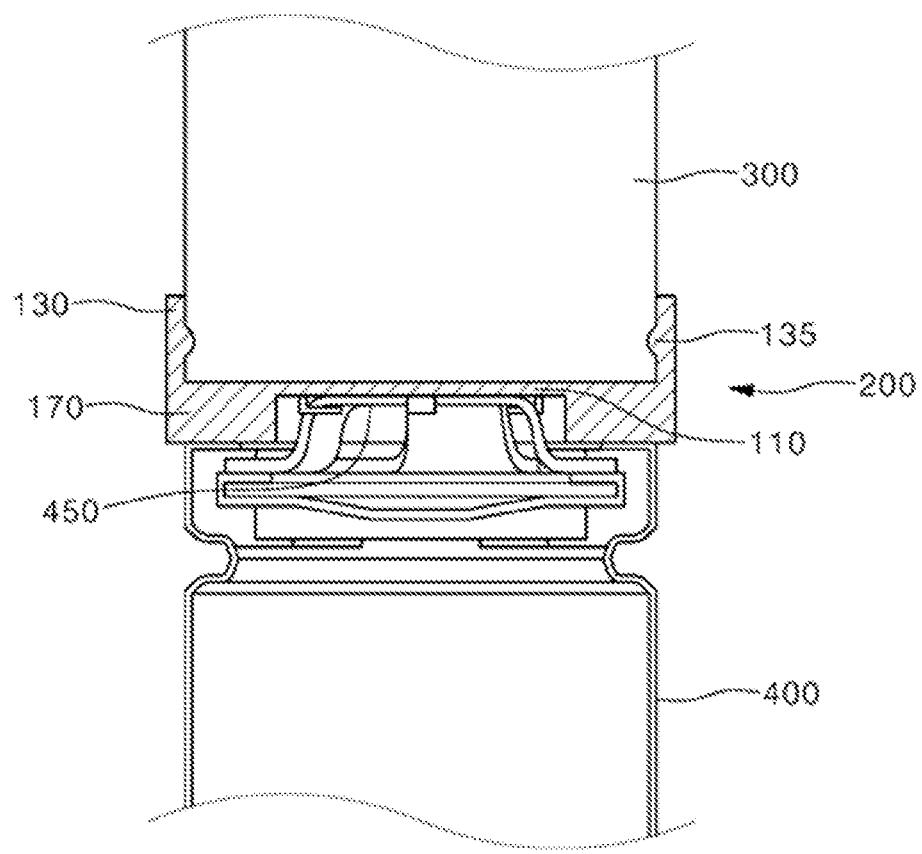

【FIG. 10】
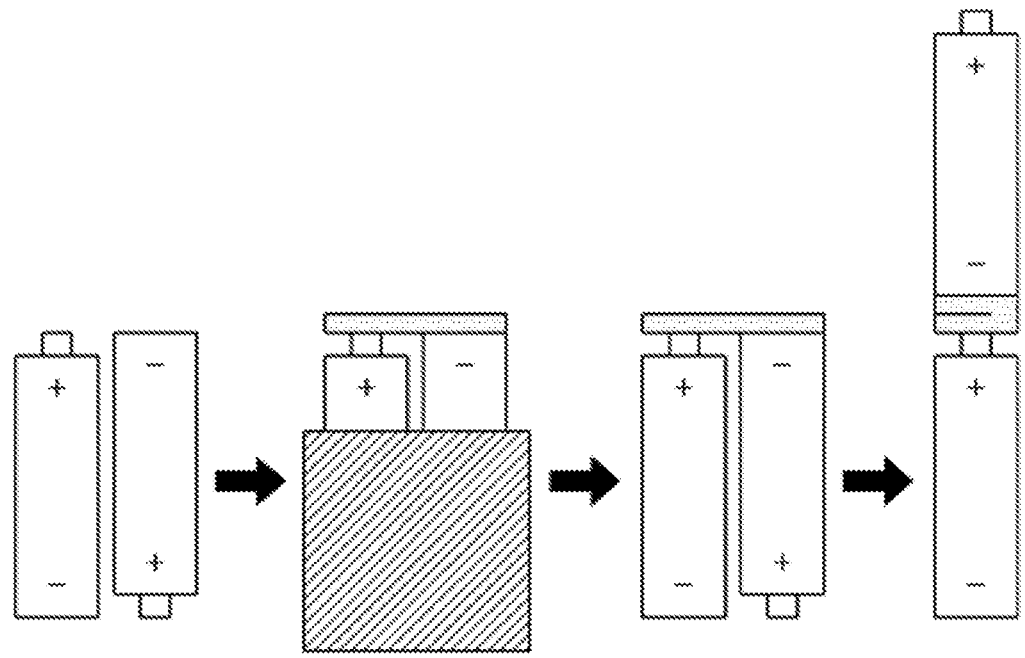

[FIG. 11]
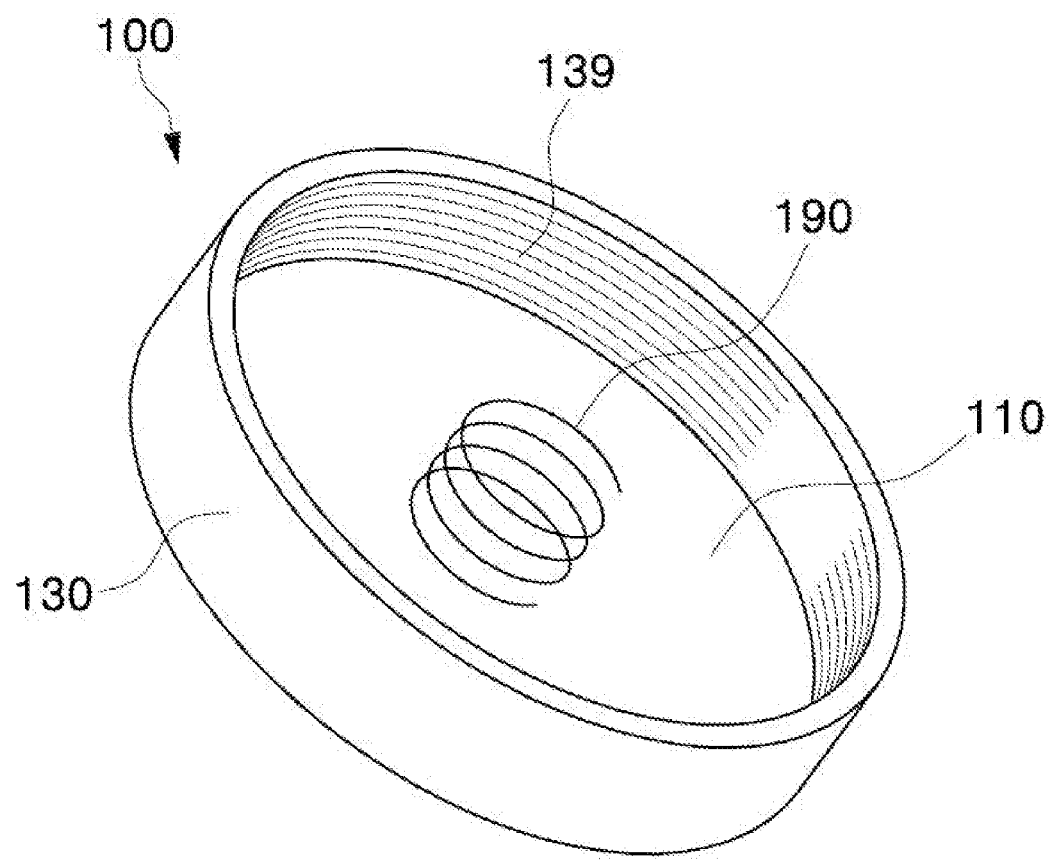

【FIG. 12】
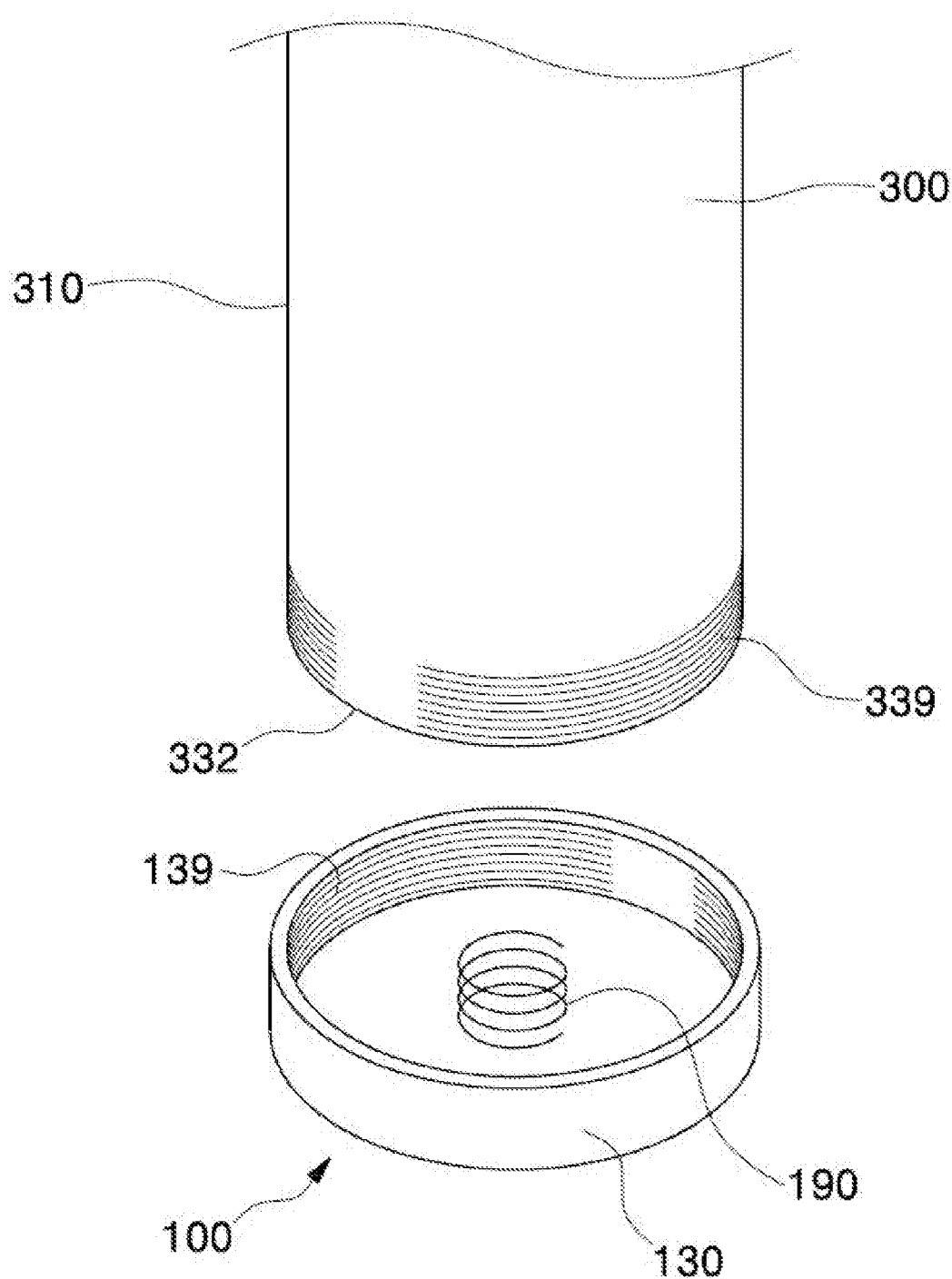

BATTERY CONNECTOR FOR SERIES CONNECTION OF BATTERIES AND BATTERY PACK INCLUDING THE SAME

This application is a Continuation of copending PCT International Application No. PCT/KR2018/013343, filed on Nov. 6, 2018, which claims the benefit of Korean Patent Application No. 2017-0176853, filed on Dec. 21, 2017 with the Korean Intellectual Property Office, the disclosures of which are herein incorporated by reference in their entireties.

TECHNICAL FIELD

The present invention relates to a battery connector, and more particularly to a battery connector for series connection of batteries and a battery pack including the same.

BACKGROUND ART

With the recent active proliferation of various kinds of mobile devices, batteries have come to be widely used as power sources for driving the mobile devices. Batteries used in industrial fields or in middle- or large-sized electronic devices require high output. For this reason, it is necessary to use a large-capacity battery or to connect a plurality of standard batteries to each other.

FIG. 10 is a view illustrating a general method of connecting two batteries to each other in series. Conventionally, as shown, two batteries are fixed to a welding frame in the state of being arranged so as to be oriented in opposite directions, and a lead is connected to a positive electrode terminal of one of the batteries and to a negative electrode terminal of the other battery by welding. Subsequently, the lead is bent such that the two batteries are arranged in a line in the state of being connected to each other in series.

The conventional series connection method includes a welding process, which increase time and expenses. Therefore, a method of more easily connecting batteries to each other in series is required.

DISCLOSURE

Technical Problem

It is an object of the present invention to provide a battery connector that is capable of connecting batteries to each other in series using only mechanical fixing means without welding.

It is another object of the present invention to provide a battery connector that is capable of stably maintaining the force of coupling between batteries connected to each other in series.

Technical Solution

In accordance with an aspect of the present invention, the above and other objects can be accomplished by the provision of a battery connector including a conductive plate configured to contact a first battery and a second battery so as to electrically connect the first battery and the second battery to each other, an upper fixer configured to be coupled to the first battery, and a lower fixer configured to be coupled to the second battery.

The conductive plate may be configured to contact a negative electrode terminal of the first battery and to contact a positive electrode terminal of the second battery.

The upper fixer may include an extension member extending upwards from an upper surface of the conductive plate and a fixing protrusion formed on the inside of the extension member, the fixing protrusion may be configured to be coupled to a groove or a step formed at a negative electrode side of the first battery.

The lower fixer may include a fixing latch extending downwards from a lower surface of the conductive plate, and the fixing latch may be may be inserted into a recess formed in a top cap of the second battery, whereby the fixing latch is coupled to the second battery.

The recess formed in the top cap of the second battery may include a vertical recess, into which the fixing latch is coupled in the vertical direction, and a horizontal recess, into which the fixing latch is coupled in the horizontal direction.

The battery connector may further include a support member extending downwards from the lower surface of the conductive plate so as to be located in the vicinity of the top cap of the second battery when the second battery is coupled to the battery connector.

The upper fixer may include an extension member extending upwards from the upper surface of the conductive plate and a screw thread formed at the inside of the extension member, the screw thread may be configured to be engaged with a screw thread formed at the negative electrode side of the first battery.

An elastic protrusion may be formed on the upper surface of the conductive plate.

In accordance with another aspect of the present invention, there is provided a battery pack including at least two batteries electrically connected to each other via the battery connector described above.

Effects of the Invention

It is possible for a battery connector according to an embodiment of the present invention to enable easy connection of batteries to each other in series using only mechanical fixing means without welding.

It is possible for a battery connector according to another embodiment of the present invention to stably maintain the force of coupling between batteries connected to each other in series.

It will be appreciated by persons skilled in the art that the effects that could be achieved with the embodiment of the present invention are not limited to what has been particularly described hereinabove and unmentioned other effects of the present invention will be more clearly understood from the following detailed description taken in conjunction with the accompanying drawings.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing the upper part of a battery connector according to an embodiment of the present invention;

FIG. 2 is a perspective view showing the lower part of the battery connector according to the embodiment of the present invention;

FIG. 3 is a view illustrating a method of coupling a first battery to the battery connector according to the embodiment of the present invention;

FIG. 4 is a view showing a top cap of a second battery;

FIGS. 5 to 7 are views illustrating a method of coupling the second battery to the battery connector according to the embodiment of the present invention;

FIG. 8 is a perspective view showing the lower part of a battery connector according to another embodiment of the present invention;

FIG. 9 is a sectional view showing the state in which the first battery and the second battery are coupled to the battery connector according to the another embodiment of the present invention;

FIG. 10 is a view illustrating a conventional method of connecting batteries to each other in series; and FIG. 11 is a perspective view showing the upper part of a battery connector according to another embodiment of the present invention; and FIG. 12 is a perspective view a method of coupling a first battery to the battery connector according to the another embodiment of the present invention.

BEST MODE

The present invention may be variously changed and may have various embodiments. Therefore, specific embodiments will be described in detail with reference to the accompanying drawings. However, it should be understood that the present invention is not limited to the specific embodiments and that the present invention includes all alterations, equivalents, and substitutes that fall within the idea and technical scope of the present invention.

In the following description of the present invention, a detailed description of known functions and configurations incorporated herein will be omitted when it may obscure the subject matter of the present invention. In addition, numerals (for example, first, second, etc.) used to describe this specification are merely identification symbols that are used to distinguish one element from another.

In addition, in the case in which one part is described as being 'connected' or 'coupled' to another part in this specification, the one part may be directly connected or coupled to the another part, or the one part may be connected or coupled to the another part via an intervening part unless mentioned otherwise.

In addition, in the case in which elements are expressed as 'parts (units)' or 'modules' in this specification, two or more elements may be combined into a single element, or a single element may be divided into two or more elements from a functional aspect. In addition, each element that will be described hereinafter may further perform some or all of the functions of other elements in addition to the main functions thereof. Of course, some of the main functions of each element may be performed by other elements.

Hereinafter, embodiments of the present invention based on the technical idea thereof will be described in detail.

FIG. 1 is a perspective view showing the upper part of a battery connector 100 according to an embodiment of the present invention, and FIG. 2 is a perspective view showing the lower part of the battery connector 100 according to the embodiment of the present invention.

Referring to FIGS. 1 and 2, the battery connector 100 according to the embodiment of the present invention includes a conductive plate 110 configured to contact a first battery and a second battery so as to electrically connect the first battery and the second battery to each other. Each of the first battery and the second battery may be a primary battery or a secondary battery.

The conductive plate 110 may be made of an electric conductor. A negative electrode terminal of the first battery may contact the upper surface of the conductive plate 110, and a positive electrode terminal of the second battery may contact the lower surface of the conductive plate 110.

FIGS. 1 and 2 show that the conductive plate 110 is circular, which, however, is merely an embodiment. In the case in which each of the first battery and the second battery is prismatic, the conductive plate 110 may also be prismatic.

The battery connector 100 according to the embodiment of the present invention includes an upper fixing means for fixing the first battery and a lower fixing means for fixing the second battery. As shown in FIG. 1, the upper fixing means may include an extension member 130 extending upwards from the upper surface of the conductive plate 110 and a fixing protrusion 135 formed on the inside of the extension member 130. FIG. 1 shows that the extension member 130 extends upwards from the entire outer edge of the conductive plate 110, which, however, is merely an embodiment. The extension member 130 may extend upwards from a portion of the outer edge of the conductive plate 110.

Each of the extension member 130 and the fixing protrusion 135 may be made of an electric conductor.

In addition, as shown in FIG. 2, the lower fixing means of the battery connector 100 may include at least one fixing latch 150 extending downwards from the lower surface of the conductive plate 110. The fixing latch 150 may be made of an electric conductor, in the same manner as the extension member 130 and the fixing protrusion 135.

FIG. 3 is a view illustrating a method of coupling a first battery 300 to the battery connector 100 according to the embodiment of the present invention.

A groove or a step 335 may be formed at the negative electrode side of the first battery 300. The diameter of an outer can 310, which surrounds the first battery 300, may be reduced only at a specific portion of the first battery 300, whereby the groove 335 may be formed. Alternatively, the diameter of the outer can 310 may be reduced only at a specific portion of the first battery 300, and then the reduced diameter of the outer can 310 may extend upwards, whereby the step 335 may be formed.

The height of the fixing protrusion 135 from the conductive plate 110 may correspond to the height of the groove or the step 335 from a negative electrode terminal 332 of the first battery 300. When the first battery 300 is inserted downwards into the battery connector 100, therefore, the fixing protrusion 135 may be coupled to the groove or the step 335 formed at the negative electrode side of the first battery 300.

In another embodiment, as shown in FIGS. 11 and 12, the upper fixing means of the battery connector 100 may include a screw thread 139 in place of the fixing protrusion 135 shown in FIG. 1. In this case, a corresponding screw thread 339 may be formed at the negative electrode side 332 of the first battery 300, and the first battery 300 may be coupled and fixed to the battery connector 100 through screw engagement between the screw thread 339 of the first battery 300 and the screw thread 139 of the battery connector 100.

An elastic protrusion 190 may be formed on the upper surface of the conductive plate 110. The elastic protrusion 190 may be made of an electric conductor, and may guarantee secure contact between the first battery 300 and the conductive plate 110. Specifically, the negative electrode terminal 332 of the first battery may not contact the conductive plate 110 even in the case in which the first battery 300 is coupled to the battery connector 100. In order to prevent this, the elastic protrusion is provided on the upper surface of the conductive plate 110.

FIG. 4 is a view showing a top cap 450 of a second battery 400, and FIGS. 5 to 7 are views illustrating a method of coupling the second battery 400 to the battery connector 100 according to the embodiment of the present invention.

Referring to FIG. 4, the top cap 450, which serves as a positive electrode terminal of the second battery 400, may be provided with at least one recess, which corresponds to the fixing latch 150. Specifically, the recess may include a vertical recess 451, formed in the vertical direction of the second battery 400, and a horizontal recess 452, formed in the horizontal direction of the second battery 400.

As shown in FIGS. 5 and 6, the second battery 400 is located under the battery connector 100, and the second battery 400 or the battery connector 100 is moved such that the top cap 450 of the second battery 400 approaches the battery connector 100. As the second battery 400 and the battery connector 100 come into contact with each other, the fixing latch 150 of the battery connector 100 is inserted into the vertical recess 451 in the top cap 450 of the second battery 400.

Subsequently, as shown in FIG. 7, the second battery 400 or the battery connector 100 is rotated. As a result, the fixing latch 150 is moved along the horizontal recess 452 in the top cap 450 of the second battery 400, whereby the second battery 400 is mechanically fixed to the battery connector 100.

According to the embodiment of the present invention, the first battery 300 is coupled and fixed to the battery connector 100 through the engagement between the fixing protrusion 135 of the battery connector 100 and the groove or the step 335 formed at the negative electrode side of the first battery 300, and the second battery 400 is coupled and fixed to the battery connector 100 through the engagement between the fixing latch 150 of the battery connector 100 and the recess in the top cap 450 of the second battery 400. Consequently, it is possible to easily connect the first battery 300 and the second battery 400 to each other in series. In other words, it is sufficient for a user to insert the first battery 300 into the extension member 130 of the battery connector 100 such that the first battery 300 is coupled to the battery connector 100 and to insert and rotate the fixing latch 150 of the battery connector 100 into the recess formed in the top cap 450 of the second battery 400 such that the first battery 300 and the second battery 400 are connected to each other in series.

Meanwhile, according to the embodiment of the present invention, when the second battery 400 is coupled to the battery connector 100, an empty space is generated in the vicinity of the top cap 450 of the second battery. In this case, the battery connector 100 and the second battery 400 may have low resistance to pressure applied thereto in the lateral direction thereof. The structure of a battery connector 200 configured to prevent this is shown in FIG. 8.

FIG. 8 is a perspective view showing the lower part of a battery connector 200 according to another embodiment of the present invention.

Referring to FIG. 8, the battery connector 200 according to the embodiment of the present invention may further included a support member 170 extending downwards from the lower surface of the conductive plate 110, unlike the battery connector 100 shown in FIGS. 1 and 2. The support member 170 may be formed in the vicinity of the fixing latch 150 so as to have the shape of a doughnut. The shape of the inner circumference 172 of the support member 170 may correspond to the shape of the top cap 450 of the second battery 400. The support member 170 may be made of an insulator. Consequently, it is possible to prevent the occurrence of an unintentional short circuit due to contact between the support member 170 and the top cap 450. The support member 170 is located in the vicinity of the fixing latch 150. Consequently, when the second battery 400 is coupled to the battery connector 200, as shown in FIG. 9, the support member 170 fills the empty space defined in the vicinity of the top cap 450.

That is, the support member 170 surrounds the empty space in the vicinity of the top cap 450, which is formed when the second battery 400 is coupled to the battery connector 200. Consequently, it is possible to prevent the second battery 400 and the battery connector 200 from being separated from each other when pressure is applied to the second battery 400 and to the battery connector 200 in the lateral direction thereof.

A battery pack according to another aspect of the present invention includes a plurality of batteries, and is characterized in that at least two of the batteries are electrically connected to each other via any one of the battery connectors 100 and 200 according to the embodiments of the present invention. That is, a plurality of batteries may be coupled to each other using the battery connectors 100 and 200 according to the embodiments of the present invention, and may then be disposed in a pack housing (not shown) so as to be assembled as a battery pack. Consequently, the batteries are easily connected to each other in series using mechanical fixing means without welding so as to be assembled as a battery pack, whereby the process of assembling the battery pack is simplified.

Those skilled in the art to which the present invention pertains will appreciate that various applications and modifications are possible based on the above description, without departing from the scope of the present invention.

The invention claimed is:

1. A battery connector comprising:
   a conductive plate configured to contact a first battery and a second battery so as to electrically connect the first battery and the second battery to each other, the conductive plate not having a through-hole;
   an upper fixer configured to be coupled to the first battery; and
   a lower fixer configured to be coupled to the second battery,
   wherein the lower fixer comprises a fixing latch extending downwards from a lower surface of the conductive plate, and
   wherein the fixing latch is configured to be inserted into a recess formed in a top cap of the second battery, whereby the fixing latch is coupled to the second battery.

2. The battery connector according to claim 1, wherein the conductive plate is configured to contact a negative electrode terminal of the first battery and to contact a positive electrode terminal of the second battery.

3. A battery connector comprising:
   a conductive plate configured to contact a first battery and a second battery so as to electrically connect the first battery and the second battery to each other, the conductive plate not having a through-hole;
   an upper fixer configured to be coupled to the first battery; and
   a lower fixer configured to be coupled to the second battery,
   wherein the conductive plate is configured to contact a negative electrode terminal of the first battery and to contact a positive electrode terminal of the second battery, and wherein the upper fixer comprises:
   an extension member extending upwards from an upper surface of the conductive plate; and
   a fixing protrusion formed on an inside of the extension member, the fixing protrusion configured to be coupled to a groove or a step formed at a negative electrode side of the first battery.

4. The battery connector according to claim 1, wherein the recess formed in the top cap of the second battery comprises:
   a vertical recess, into which the fixing latch is coupled in a vertical direction; and
   a horizontal recess, into which the fixing latch is coupled in a horizontal direction.

5. The battery connector according to claim 1, further comprising a support member extending downwards from the lower surface of the conductive plate so as to be located in a vicinity of the top cap of the second battery when the second battery is coupled to the battery connector.

6. The battery connector according to claim 1, wherein the upper fixer comprises:
   an extension member extending upwards from an upper surface of the conductive plate; and
   a screw thread formed at an inside of the extension member, the screw thread being configured to be engaged with a screw thread formed at a negative electrode side of the first battery.

7. The battery connector according to claim 1, wherein an elastic protrusion is formed on an upper surface of the conductive plate.

8. A battery pack comprising at least two batteries electrically connected to each other via the battery connector according to claim 1.

9. A battery connector comprising:
   a conductive plate configured to contact a first battery and a second battery so as to electrically connect the first battery and the second battery to each other;
   an upper fixer configured to be coupled to the first battery; and
   a lower fixer configured to be coupled to the second battery, the lower fixer including a fixing latch extending downwards from a lower surface of the conductive plate,
   wherein the fixing latch is configured to be inserted into a recess formed in a top cap of the secondary battery, whereby the fixing latch is coupled to the second battery, and
   wherein the recess formed in the top cap of the second battery comprises:
   a vertical recess, into which the fixing latch is coupled in a vertical direction; and
   a horizontal recess, into which the fixing latch is coupled in a horizontal direction.

\* \* \* \* \*